July 25, 1933.  S. S. GREEN  1,920,030
CIRCUIT CONTROLLER
Original Filed April 23, 1930  2 Sheets-Sheet 1
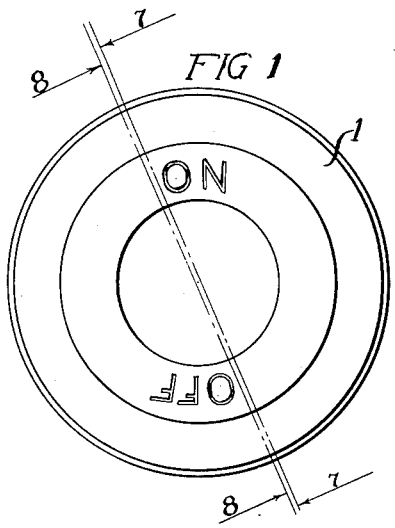
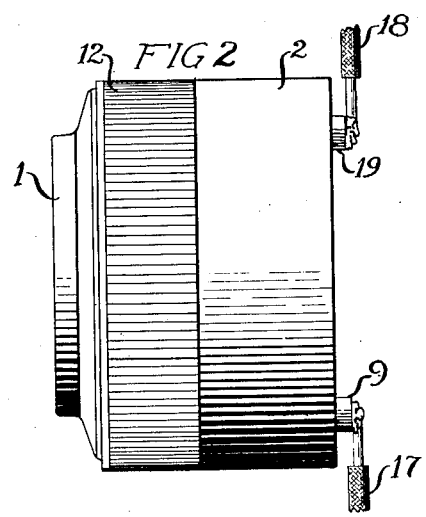
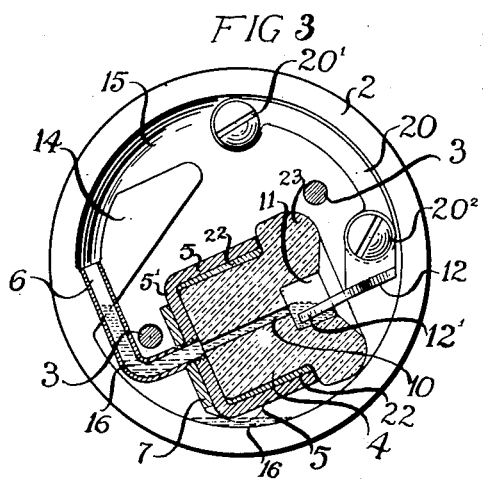
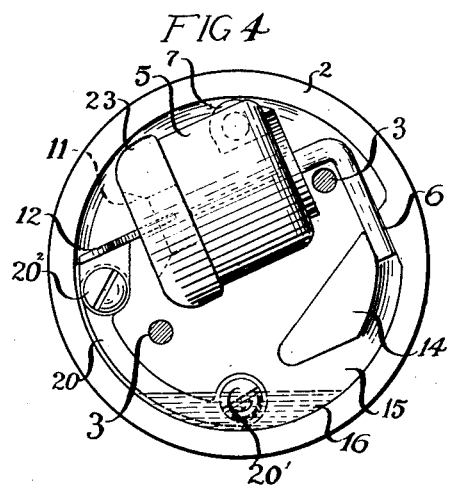
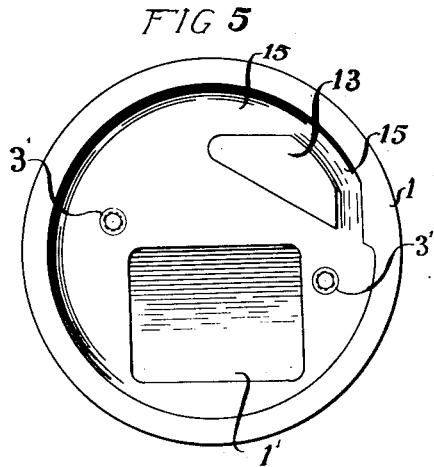
Stanley S. Green.
INVENTOR
BY G. L. Cragg
ATTORNEY July 25, 1933.  S. S. GREEN  1,920,030
CIRCUIT CONTROLLER
Original Filed April 23, 1930  2 Sheets-Sheet 2
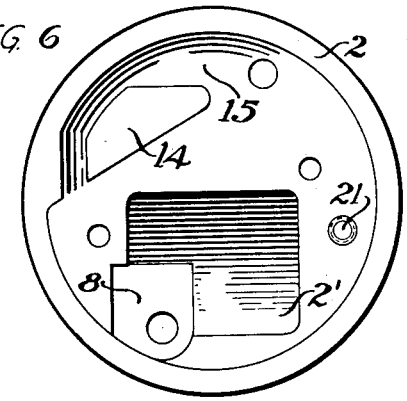
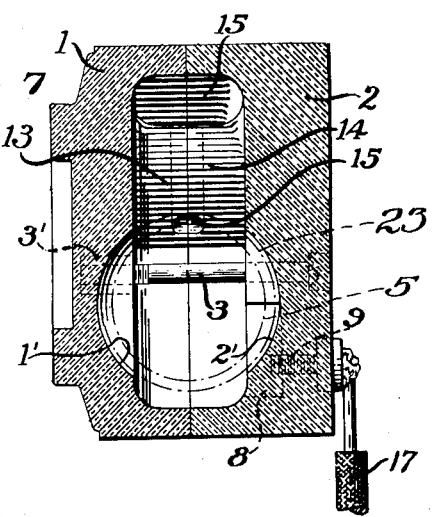
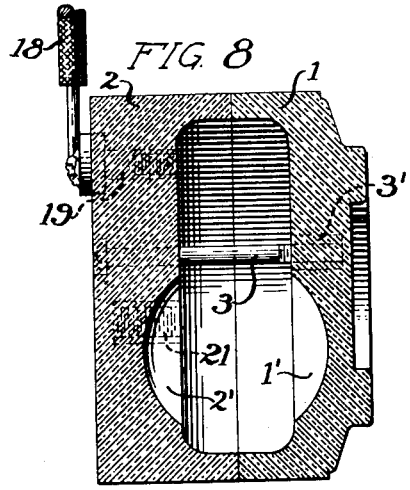
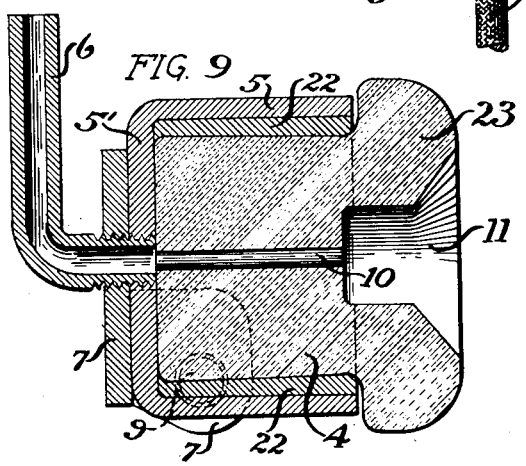
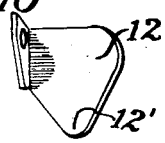
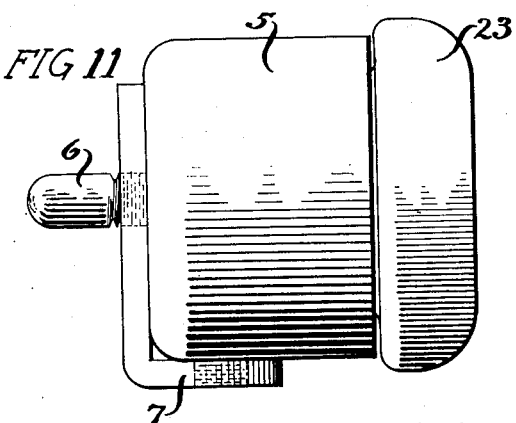
Stanley S. Green.
INVENTOR
BY G. L. Gragg
ATTORNEY Patented July 25, 1933

1,920,030

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

CIRCUIT CONTROLLER

Application filed April 23, 1930, Serial No. 446,566. Renewed December 2, 1932.

My invention relates to controllers for electric circuits and is of particular utility in connection with structures forming the subject matter of my copending application Serial No. 285,114, filed June 13, 1928, though my invention is not to be limited to this use. In my said copending application I have disclosed an electric circuit controller which is inclusive of a body of electric current conducting material, such as mercury that is normally contained in the bore or passage of a conduit made of insulating material. This current conducting liquid serves to electrically connect two electrodes of the associated circuit, when the device is in circuit closing position. When there is an abnormal flow of current through the device the liquid conductor, or a sufficient portion of it, is expelled to break the electrical connection between the electrodes and thereby open the circuit and guard the translating device within the circuit. The liquid conductor and associated electrodes and parts thus constitute a circuit protecting switch.

My present invention has for its general object an increase in the reliability and accuracy of such a switch and the formation of a switch structure which will more effectively withstand the violence that attends its operation. In carrying out my invention, I employ a substantially non-porous conduit or control tube of insulating material for containing the circuit closing liquid conductor. This material is an improvement upon conduits formed of porous insulating material such as dry process porcelain, since the material of my preference lacks pores which are apt to contain occluded gas and metallic or other solid impurities. Further advantages in the material of my selection will be hereinafter set forth. I also desirably make the conduit of very large cross section in relation to its bore, so as to resist explosive pressures. I further strengthen the conduit by surrounding it with a strong metallic jacket made peferably of iron and into which the conduit is tightly received. A lining preferably of non-cementitious material such as lead may tightly intervene between the conduit and the iron portion of the jacket to constitute a part of the jacket. This jacket serves to resist bursting pressures to which the conduit is apt to be subject. The lead may be poured, while molten, into the space between the jacket and conduit. The conduit is suitably spaced from the casing to avoid fracture.

The invention has other characteristics and will be more fully explained in connection with the accompanying drawings in which Fig. 1 is a front elevation of the preferred form of circuit controller shown in normal circuit closing or "on" position; Fig. 2 is a side elevation of the device as it appears in Fig. 1; Fig. 3 is a front elevation, partially in section, the removable front section of the enclosing casing being omitted; Fig. 4 is a view, somewhat similar to Fig. 3, but showing the controller in its "off" position and illustrating parts in elevation that appear in section in Fig. 3; Figs 5 and 6 are, respectively, interior elevations of the front and rear sections or halves of the casing with the parts enclosed by the casing omitted; Fig. 7 is a sectional view on line 7—7 of Fig. 1, but with two of the switch parts dotted and dashed and the balance omitted for the sake of clearly showing the casing structure; Fig. 8 is a sectional view on line 8—8 of Fig. 1 with parts omitted; Fig. 9 is an enlargement of a portion of Fig. 3, but in a different position for ease of illustration; Fig. 10 is a perspective view of one of the electrodes; and Fig. 11 is a side elevation of the switch portion of the structure removed from the sectional casing.

In the form of the invention illustrated the casing is altogether of insulating material, such as moulded Bakelite, excepting for the bolts, screws and the anchorages for these parts that are united therewith. This casing is inclusive of the front half or removable section 1 and the rear half or removable section 2. These casing sections are clamped snugly together, as by means of the metallic bolts 3 which pass through the rear casing section 2 and into the inserts 3′ that are moulded in the front casing section 1, the bolts being screwed into these inserts.

Said inserts do not extend through the casing section 1, which is thus imperforate throughout. The bolts 3 have heads that are received within recesses that are formed in the back of the rear casing section 2, suitable cementing material being placed in these recesses and over the heads of these bolts, so that the rear casing section is imperforate where these bolts are located. The pressure exerted by said bolts is sufficient to bring the engaging flat faces of the casing sections into intimate contact so that the casing is also imperforate in this region and throughout the entire circumference of the casing which is desirably cylindrical. The circuit controlling element is within the casing and is operable to "on" and "off" positions by suitably moving the casing which is desirably rotatively mounted upon its axis, for this purpose, though the invention is not to be thus restricted. This circuit controlling element includes, as shown in the embodiment of the invention illustrated, a flanged tube or conduit 4 of refractory insulating material, preferably porcelain produced by the wet process. This tube or conduit is surrounded by a reinforcing metal collar or jacket 5, preferably made of iron. The jacket or collar 5 desirably has an end wall 5', integrally formed therewith, and which constitutes this jacket a cup against which the conduit 4 is bottomed. A metallic feeding tube 6, also desirably formed of iron, is screwed within and through a metallic bracket 7 and into the cup bottom wall 5'. This tube serves to hold the cup or jacket 5, 5' in assembly with the bracket. It also constitutes one of the electrodes of the device, the bore of this tube being in communication with the bore of the conduit 4, both of these bores containing the liquid current conductor when the device is in circuit closing or "on" position. The bracket is of angular formation, as illustrated in Fig. 11, the tube 6 being screwed into one of the branches of the bracket that extends along the axis of the casing, the other branch or base of the bracket being snugly received in a recess 8 that is formed in the rear casing section 2 and which serves to prevent the bracket from turning. A metallic bolt 9 is passed through the rear casing section 2 into threaded engagement with the bracket base, whereby the bracket is firmly clamped upon this casing section. The head of this bolt is embedded within cement that is applied to the casing section 2 before the bolt is inserted, whereby this casing section is rendered imperforate at this point.

The bore 10 of the refractory tube or conduit 4, throughout the greater part of the length or axial dimension of this conduit, is of predetermined or calculated and preferably uniform cross section and length and is enlarged at its discharge end into a well 11. The other electrode 12 tapers into a tip 12' which is closely approached to the bottom of the well and is somewhat below the axis of said bore, so that when the device is in a circuit closing or "on" position, this electrode will be in electrical connection with the liquid conductor that is then contained in the hollow electrode 6, the bore of the conduit 4 and the well 11, whereby the circuit having the device is closed thereat and is completely closed if the circuit is elsewhere closed at some translating device, such as an incandescent lamp, that is upon the exterior of the casing at a place of current consumption. The casing sections are also respectively moulded to form recesses 1', 2' that are cylindrical in curvature to conform to the curvature of the jacket 5 which is received therein and is coaxial therewith, there being desirably slight arcuate clearance between these recesses and said jacket. Mating projections 13 and 14 are respectively integrally moulded with the casing sections 1 and 2, these projections meeting and being so shaped as to form, with contiguous portions of the casing, a funnel shape space 15. The receiving end of the tubular electrode or electrode conduit 6 is snugly received in the stem of this funnel and virtually constitutes a continuation thereof. Said funnel and the conduit 4 are so positioned with respect to the casing that, when the device is turned from "on" to "off" position the mercury will be discharged from the conduits 4 and 6 and the well 11 into the surrounding space and to an extent to open the circuit at 12', the liquid conductor being conveyed by gravity to the then bottom of the casing as indicated at 16 in Fig. 4. When the device is turned from "off" to "on" position, the cup of funnel 15 will gather the liquid conductor which is conveyed by gravity through the cup and stem of the funnel and into the feeding tube or hollow electrode 6 and into the bore 10 and well 11 of the insulating conduit 7, whereby the circuit is closed at the tip 12' of the electrode 12.

In the position shown in Figs. 1, 2, 3, 7 and 8 the liquid conductor fills the major portion of the hollow electrode 6, the bore 10 of the insulating conduit 4 and a sufficient portion of the well 11 to immerse the electrode tip 12' for the purpose of closing the circuit. To insure closure of the circuit, I provide an excess of mercury or liquid conductor which finds lodgement in the then bottom of the casing, as indicated at 16 in Fig. 3, this excess flowing from the well when the device has been fully brought to its "on" or circuit closing position. For convenience in turning the switch to its alternative positions the casing section 1 may be knurled, as indicated at 1² in Fig. 2.

I have shown no means for limiting the movement of the casing and the enclosed switch to a range between the "on" and "off" positions as such may obviously be employed, if desired. As illustrated, the device is in full circuit closing position when the index "on" is uppermost and in a full circuit opening position when the index "off" is uppermost. Obviously, these indexes may be otherwise disposed in relation to the switch. The lead 17 in which one side of the protected or controlled circuit terminates is preferably flexible and may be connected by solder with the metallic bolt 9 that is screwed into the base of the metallic bracket 7 into which the hollow electrode 6 is screwed, whereby this electrode is connected with this lead. The lead 18 in which the other side of the protected on controlled circuit terminates is also preferably flexible and may be connected by solder with the metallic bolt 19 which is also imbedded tightly in sealed connection with and projects through the casing. This bolt is connected by a current conducting member 20 with the electrode 12 preferably by means of a metallic screw 20' which fastens one end of the member 20 to the inner end of the bolt 19. The other end of said member 20 is connected by a metallic screw 20² with the electrode 12, this screw being threaded into the metallic insert 21 which is imbedded within, but does not extend through the casing section 2. When the device is in "on" or circuit closing position and the controlled circuit is closed at a lamp or other translating device, the protected or controlled circuit is closed through the flexible lead 17, the metallic bolt 9, the metallic bracket 7, the hollow electrode 6, the mercury in this electrode and in the conduit bore 10 and well 11, the electrode 12 whose tip 12' dips into the mercury in said well, the screw 20², the conducting member 20, the screw 20', the bolt 19 and the flexible lead 18.

In the "off" or circuit opening position shown in Fig. 4 the mercury or liquid conductor has been discharged from the electrode 6, bore 10, and well 11 to open the circuit portion, above traced, at the electrode 12 and its tip 12', the discharged mercury gathering at 16, Fig. 4, where it is adjacent the cup of the funnel 15 in readiness to be received within this cup to be passed therefrom into the stem of the funnel, the other electrode 6 and the conduit 4, when the device is again turned to its "on" or circuit closing position.

I have discovered that the refractory tube or conduit 4 is best made of a high grade wet process porcelain. The wet process of producing porcelain is well distinguished from the dry process. In producing porcelain by the wet process, the clay composition is mixed with sufficient water to form a homogeneous plaster or dough-like mass which may be poured, moulded or extruded with the application of little mechanical force or pressure. In contrast, the dry process employs relatively little water, the porcelain being less homogeneous and requiring heavy moulding pressure to secure the desired shaping. After kilning in the wet process, a ceramic product is obtained that is substantially non-porous and homogeneous throughout, while a dry process ceramic product lacks homogeniety and is very porous and the pores are apt to contain occluded gases and metallic or other solid impurities in varying degrees, rendering it difficult to standardize the devices. Other non-porous materials may be used such as glass and quartz.

The liquid filled conduit bore 10 must reliably carry all current up to and including the predetermined rated current corresponding to the predetermined size of this bore. Above this value, vaporization of the liquid conductor occurs causing ultimate expulsion of liquid conductor from the bore and automatic interruption of the circuit. With currents approaching the rated current, the liquid conductor and the refractory tube are heated to a temperature approaching but falling short of the boiling temperature of the mercury or other liquid conductor used. The highly porous ceramic materials may give off some of their occluded gases or impurities in gaseous forms. Bubbles of these impurities may displace the liquid conductor in the conduit bore 10 to an extent that would break the circuit but prematurely and erratically. Non-porous materials are free of this difficulty. I prefer the wet process porcelain to the non-porous glass or quartz mainly because it is more easily and accurately fashioned into the desired shape.

Upon heavy short circuits an explosive effect takes place within the tube 4. In a nominal one hundred and fifteen volt circuit having a capacity sufficient to supply in the neighborhood of five thousand amperes, the vaporization of the liquid within the bore 10 is completed within a very small fraction of a second. Expansion of thi liquid into a vapor is so sudden and com plete as to cause an explosion which is not only powerful but shattering.

The preferred materials for tube 4 being vitreous or brittle in nature are in themselves usually incapable of repeatedly standing great explosive force and for successful often repeated operations require reinforcement by a stronger and non-brittle substance. The metal collar 5 provides this reinforcement. In the construction shown, tube 4 has a straight cylindrical portion slightly smaller in diameter than the collar 5. The space between the tube 4 and collar 5 is filled with a medium 22 to firmly hold these parts in relative position. Such a medium may be a non-cementitious material, such as melted metal such as lead or a mixture of lead and antimony which is allowed to cool and contract along with the heated collar 5 to tightly squeeze the tube 4. Although collar 5 may be made of any metal with fair mechanical strength, I prefer iron because of its immunity to the action of mercury.

After collar 5 and tube 4 are in permanent position, the medium 22 filling the space between the parts 4 and 5 is not subject to the action of the mercury. If desired, a slight draft may be formed on the outside of the tube 4 and on the inside of the collar 5 so that when such space has been filled with the lead or other element the tube 4 cannot be removed from said collar. The conduit 4 of refractory material may develop faults and cracks which would cause it to fall apart, if unreinforced, the reinforcement 5 holding the cracked conduit intact so that it will continue to function. High explosive pressure in the conduit bore 10 is somewhat relieved by the passage of the mercury and its vapor into the expanded volume afforded by the electrode well 11. Flange 23 around the well and the adjacent jacket 5 cooperate to prevent the well end of said conduit from breaking. Said flange also has a useful function in providing a lengthened flashover distance for current around the conduit.

The feed tube or hollow electrode 6 is also subject to violent shock and pressure upon explosive interruption of the circuit as mercury vapor is driven violently out of both ends of conduit 4. Such pressure and shock subject the interior of the feed tube to strain and tend to throw the liquid conductor over the upper end of this tube. This tube is desirably made of iron to withstand this violence.

The insulating casing 1, 2 is entirely relieved of any harmful hydraulically communicated concussion originating in the conduit bore 10, such effect being mainly taken up by the reinforced non-shatterable conduit 4 and feed tube or electrode 6 and only communicated to the casing through the cushioning effect of the expansion space within the casing. This advantage is of particular importance where the casing is formed of brittle material. The parts within the casing are preferably either made of or are plated with iron to withstand the action of the mercury. In plating, other mercury resisting materials may be employed, such as tungsten or nickel. If desired, the interior of the hermetically sealed casing may have its filling completed by a suitable gas such as nitrogen or carbon dioxide instead of air, or it may be evacuated of air or gas.

The conduit 4 and its flange 23 are entirely desirably spaced apart from the surrounding casing 1, 2 to insure the freedom thereof from any modification of the action of the device that might follow the engagement of the conduit and casing.

Of more importance, however, is the fact that spacing, filled only by air or gas, between the conduit and the surrounding casing eliminates the possibility of injuring the casing by the conduit when the mercury is blown.

Changes may be made without departing from the invention.

Having thus described my invention, I claim:

1. A current-limiting circuit controller comprising a closed casing forming an expansion chamber, an insulating control tube having a bore therethrough communicating with said chamber through its end, a liquid conductor normally filling said bore, a pair of electrodes electrically connected by such conductor in said bore, said bore being of such caliber that the liquid conductor therein will vaporize at a predetermined current load, said tube having at one end an enlarged well through which the bore communicates with the chamber and which receives an electrode, and an insulating flange around the tube at said end.

2. A current-limiting circuit controller comprising a closed casing forming an expansion chamber, an insulating control tube having a bore therethrough communicating with said chamber through its end, a liquid conductor normally filling said bore, a pair of electrodes electrically connected by such conductor in said bore, said bore being of such caliber that the liquid conductor therein will vaporize at a predetermined current load, said tube having at one end an enlarged well through which the bore communicates with the chamber and which receives an electrode, an insulating flange around the tube at said end, and a metallic reinforcing jacket surrounding and tightly and rigidly enclosing the tube substantially throughout the length of said bore only.

3. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, a metallic reinforcing jacket surrounding and tightly enclosing the control tube, and a non-compressible lining tightly interposed between said jacket and control tube.

4. A current-limiting circuit controller comprising a control unit including an insulating control tube having a bore therethrough, a liquid conductor normally filling said bore, a pair of electrodes electrically connected by the liquid conductor in said bore, the said bore being formed in a non-porous material and of such caliber that the liquid conductor therewithin will vaporize at a predetermined current load, a metallic reinforcing jacket surrounding and tightly enclosing the control tube, and a non-cement lining tightly interposed between said jacket and control tube.

5. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, a metallic reinforcing jacket surrounding and tightly enclosing the control tube, and a non-compressible lining tightly interposed between said jacket and control tube, said lining being formed of a metal which expands on freezing.

6. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, one of said electrodes being hollow and in fluid conducting communication with the bore of said control tube to provide a port therefor, and a casing in which said control tube is mounted and adjustable to place the conducting liquid in circuit opening and closing positions.

7. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, one of said electrodes being hollow and in fluid conducting communication with the bore of said control tube to provide a port therefor, the other end of said bore being enlarged into a well and containing a portion of the liquid conductor into which one electrode projects.

8. An overload-protective circuit controller comprising a casing movable to off and on positions and containing an expansion chamber, an insulating tube having a control bore communicating at each end with the expansion chamber, liquid conductor within the casing and two electrodes exposed at the ends of said bore to provide a current path lengthwise through said bore when it is filled with liquid conductor, one of said electrodes comprising a metal member having a hole therein communicating with said control bore for the passage of liquid conductor therethrough, said metal member being provided with an extension which surrounds and mechanically reinforces a portion of the insulating tube.

9. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, one of said electrodes being hollow and in fluid conducting communication with the bore of said control tube, and a cup constituting a continuation of said hollow electrode and tightly receiving said control tube to reinforce it.

10. A current-limiting circuit controller comprising a control unit including an insulating control tube having a bore therethrough, liquid conductor normally filling said bore, a pair of electrodes electrically connected by the liquid conductor in said bore, the said bore being formed in a non-porous material and of such caliber that the liquid conductor therewithin will vaporize at a predetermined current load, one of said electrodes being hollow and in fluid conducting communication at one end with the bore of said control tube, there being a funnel which includes the other end of said hollow electrode in its stem.

STANLEY S. GREEN.